June 7, 1966  H. A. RAUSING  3,255,339
LOCKING SYSTEM AS WELL AS A TOKEN CONTROLLED VENDING
MACHINE PROVIDED THEREWITH
Filed Aug. 14, 1961  5 Sheets-Sheet 5

INVENTOR
Hans Anders Rausing

BY *Pierce Schiffler & Parker*
ATTORNEYS

United States Patent Office 3,255,339
Patented June 7, 1966

---

3,255,339
LOCKING SYSTEM AS WELL AS A TOKEN CONTROLLED VENDING MACHINE PROVIDED THEREWITH
Hans Anders Rausing, Lund, Sweden, assignor to AB Metior, Stockholm, Sweden, a Swedish company
Filed Aug. 14, 1961, Ser. No. 131,335
Claims priority, application Sweden, Aug. 15, 1960, 7,812/60
9 Claims. (Cl. 235—61.7)

This invention relates to a locking system, especially for vending machines, of the type including on one hand several single key means and on the other hand at least one locking means which is releasable by each of said key means depending upon the sensing of respective key signatures.

Nowadays a variety of goods are sold without any active assistance by the seller. In these cases the sales take place by means of vending machines by which the goods are delivered to the customer after he has deposited the proper coin or coins in the machine. Vending through machines as hitherto carried on consequently is based solely upon cash transactions and therefore coins or counters are required.

Besides the fact that the above-mentioned vending machines require faultless coins for satisfactory operation and that the risk of the use of counterfeit coins of the same size and form as real coins has not yet been avoided, the vending by means of machines as practiced hitherto is associated with additional disadvantages. Thus, it has only been possible to use this method of vending for a limited number of goods having such selling prices that a not too large number of coins is required in order to put the vending machine into operation. Selling prices up to several coin units constitute, for this reason, the upper limit for vending through machines. For this reason a large number of goods, which especially owing to their widespread use and to their few types and fixed quality and composition are eminently suited for vending through machines, are withheld from such a vending system.

To these kinds of goods belongs especially fuel for vehicles for combustion motors. A certain vending of fuel by the help of vending machines is already carried on in accordance with the above suggested lines of direction. This vending through vending machines is, however, limited to so called mopeds and to vehicles with a small need of fuel and hence with small fuel tanks, and the vending in these cases is still based upon cash transactions.

Many advantages may be won, if the vending through vending machines can be based upon the principle that payment from the customer for goods delivered over a period of time, i.e. vending on credit, if the machine can make this form of vending possible. It should be possible to eliminate the upper limits for vending through vending machines, which limits are defined by the price of the goods. Thus the customer would not be dependent on available coins and could repeat his purchases over a period of time which depends solely upon the need and not upon the available coins. In addition misuse can be eliminated entirely in that the transaction by suitable means can be checked in respect to the upper limit within which the customer can utilize the goods as well as the risk that unauthorized persons might procure the goods for themselves.

The above-mentioned remarks regarding the goods and the vending are valid for such services which mainly could be furnished in accordance with the same principles. Examples of services of this kind are connecting operations in telephone systems, issuing of temporary insurance letters for journeys etc. There are already telephone and insurance slot machines, which, however, are all of the above-mentioned cash transaction type.

In automatic telephone systems, however, the "vending" of services is based upon credit transactions. The subscribers connected to the system can consequently have an automatic connection with their respective telephone apparatuses. After a finished telephone conversation the information required for debiting is entered in a central register in order later to be put together with information regarding other connections from the same apparatus within a certain period of time and incorporated in a bill which is sent to the subscriber.

This kind of vending through vending machines, however, presupposes that the customer/subscriber at each "purchase" uses one and the same telephone apparatus. Thus the vending transaction is limited for each customer to a certain place and a certain telephone apparatus.

In accordance with the present invention the customer, however, shall be able to get the goods or secure the actual service independently of time or space, and wherever measurements are adopted in order to furnish the goods desired through self-service and later payment.

This is possible owing to the fact that the vending machine system is provided with a locking system of the type in question, where the key means consist of tokens and the real locking means is arranged to release and start the automatic service function.

Thus, the locking means in accordance with the invention is mainly characterized in that the key means each have a certain signature with several index elements divided up into two groups, each having the same number of elements and between which for all key means there is one and the same transforming code, and the said locking means at the sensing of the signature of a key means is arranged at least indirect to compare one index group of the key means with at least the said other group in order to prevent a releasing of the locking means by means of an illegitimate key means.

The locking means is suitably arranged consecutively to compare one of the index element groups with stored counter parts of key signatures to the index element group, whose key signatures by revocation or otherwise lack legitimacy. Furthermore, the locking means according to the invention is suitably arranged in dependence upon the sensing of its key signature to confiscate the key means when it is attempted to release the locking means by means of an illegitimate key means.

Some key means can be intended for single use and in that case each has at least one pair of common index elements associating the both said groups and having corresponding significance. The locking means is then arranged in dependence upon the occurrence of these fixed elements to confiscate the single use key means.

In respect to the single use key means a modification in accordance with the invention is also possible, viz. that the single use key means besides their specific key signature have at least one common characteristic and besides the signature sensible index element, when the locking means is arranged to confiscate the key means in dependence upon the occurrence of this separate index element.

The invention relates to a locking means provided transmitting apparatus of the type containing at least one transmitting means and, in dependence upon the fulfilling of a transmitting operation, means to register the datas required for later debiting of said transmitting operation. In this apparatus the locking means is arranged after setting the apparatus into operation by means of a key means in said register means to store information about at least one significant part of the signature of said means.

If the transmitting apparatus is provided with several transmitting means, each of these suitably has its own locking means but common register means for all of the transmitting means.

In the following the invention is described with reference to a suitable embodiment shown in the accompanying drawings, said embodiment showing several transmitting means intended for vending of fluids, for example fuel for combustion motors.

Figure 1:
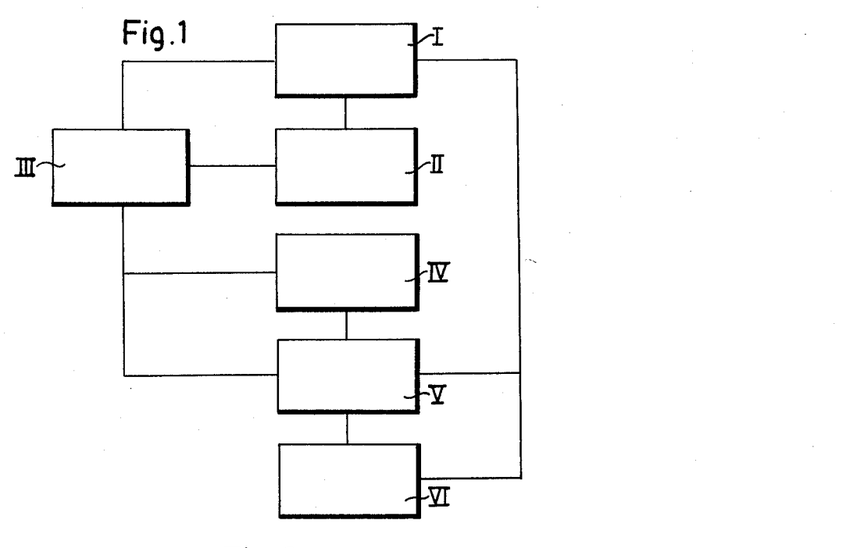
FIG. 1 shows the actual vending machine system in form of a block scheme.

As obviously appears from the block scheme in FIG. 1, the vending machine system in accordance with the invention includes an identification unit I, a blocking check unit II, a control unit III, an individual register unit IV, a queue selection unit V and a common register unit VI. The four first mentioned units are assigned to the same pump unit, hence the queue selection unit V and the common register unit VI shall serve several filling pumps in one and the same filling station.

The identification unit I has two functions. On one hand it attends to the falsification checking for the token, and on the other hand it reads the identification data of the token. The blocking check unit II is intended to check whether a token having passed the falsification checking is legitimate or not. The blocking checking is carried out as a counter checking regarding stored registrations of the identity of "blocked" tokens.

Depending upon the falsification checking and the blocking checking the filling pump is started in order to deliver the fuel quantity required. The required information for the filling, i.e. fuel quantity, quality (price), the identity of the filling station, date etc., are registered or are already registered in the individual register unit IV of the filling pump.

For the final registration of the valid data, the data available in unit IV as well as the identity of the token are transferred to the common register unit VI via the queue selection unit V. As far as the particular filling pump is concerned its identifying, blocking check, and register units I, II and IV and the queue selection unit V are controlled by the control unit III.

Before the more detailed description of the actual system begins, it is appropriate further to illustrate the punching of the token. As is apparent from FIG. 3, the token is assumed to have the shape of a card 1 being suitably made of a strong and resistant material, for example metal or plastic. The token 1 is provided with two series 2 and 3 of hole punchings in common punch card code. One of the hole series 2 indicates a seven digit account number, in this case 3762410, while the other hole series 3 is a similar seven digit check number, in this case 3475291, having a certain code relation to the number of the customer. In the case shown the check number is obtained in that the account number without carrying between the figure places is added to the number 5713881, through which the figure in the respective figure places of the check number is permuted with corresponding figures in the number 5713881.

Figure 3:
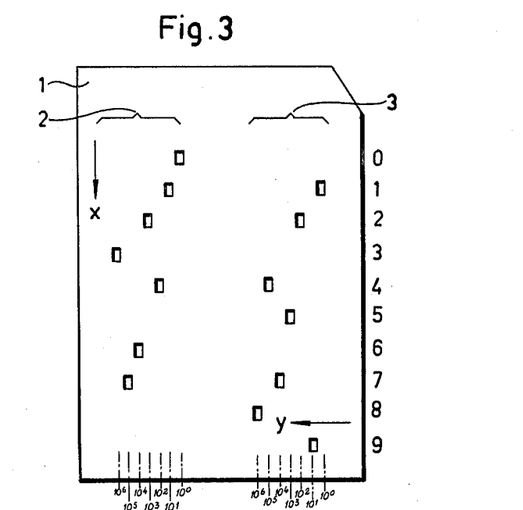
FIG. 3 is a view of a token of punch card type, being intended to be used in the system.

The hole series 2 and 3 are displaced in the digit position direction a certain digit position from each other. Although the hole punching of both numbers for practical reasons are shown in common denomination rows for the both numbers in the digit position direction, of course other arrangements are possible as well as other code relations between account number and check number, if consideration thereof are taken in the construction of the identification unit I.

Figure 4:
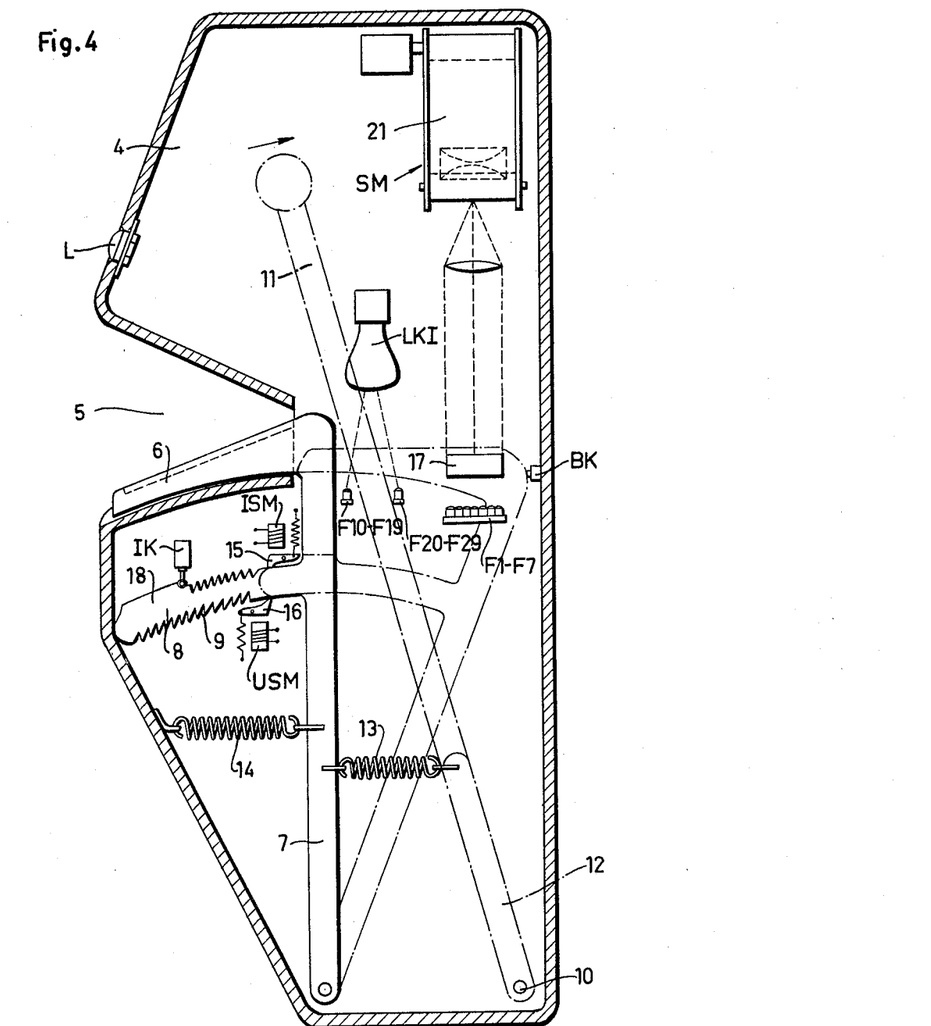
FIG. 4 is a schematic side section of a token receiver with built in units for identification and checking legitimacy.
Figure 5A:
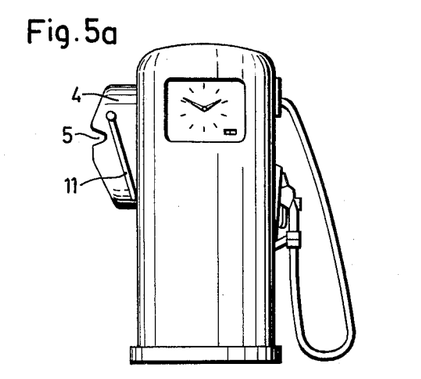
FIGS. 5a and 5b show this receiver in side and front views arranged on a filling pump of common type.
Figure 5B:
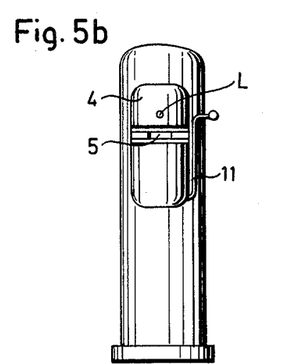
Figure 6A:
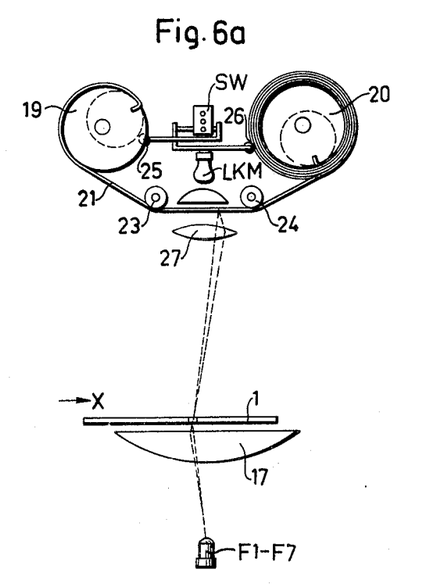
FIGS. 6a and 6b show in front and side views the legitimacy check unit.
Figure 6B:
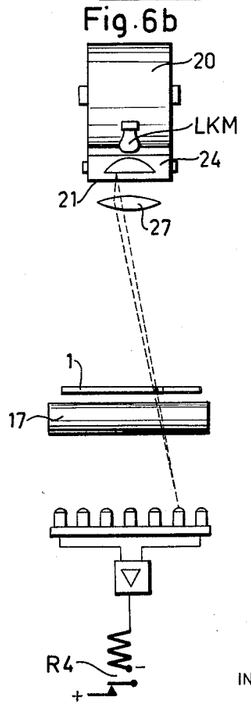

The identification unit I together with the blocking check unit II is placed in a token receiver house 4, being shown in FIGS. 4 and 5. The token receiver house 4 is located on one side of the filling pump and has a slot 5 on its front. A frame-shaped casing for the tokens is arranged in rest position mainly in horizontal direction to project out of said slot 5. The token casing 6 is supported by the upper end of a downwardly pivotably mounted lever 7. Between its ends this lever 7 is provided with a blocking arm 8 formed in an arc in the same direction as the casing 6, which along its upper side as well as its lower side is provided with ratchet teeth 9.

Down in the lower part of the house 4 on the opposite side of the lever 7 in relation to the blocking arm 8 a shaft 10 is journalled in bearings parallel with the pivot pin of lever 7, which shaft projects out from the house 4 on one of its sides. To the end of this shaft one end of an upwards turned operation handle 11 is attached. To the part of the shaft located inside of the house 4 the one end of a likewise upwards turned lever 12, in FIG. 4 being shown in the same position as the operation handle 11, is attached. An essentially horizontal draw spring 13 joins the upper end of the lever 12 and the lever 7 at a point between the lower end of the lever 7 and the blocking arm 8. On about the same level and on the same side of the blocking arm 8 the lever 7 is joined with the inside of the adjacent front wall of the house 4 by means of an essentially horizontal draw spring 14.

By means of a stepping magnet ISM adjacent to the spring action liftable pawl 15 is arranged to co-operate with the ratchet teeth on the upper side of the blocking arm 8. In the resting position of the lever 7 the pawl 15 rests against an untoothed part of the blocking arm 8 located inside the upper ratchet teeth. The pawl 15 is arranged in mesh with corresponding ratchet toothing to prevent the lever 7 from swinging inwards against the back wall of the house 4, but on the other hand admit swinging in the opposite direction. The ratchet toothing defines seven figure places in both numbers of the token cards corresponding blocking positions.

The ratchet toothing on the lower side of the blocking arm 8 is arranged to co-operate with a downward movable pawl 16 which is urged by means of a stepping magnet USM against the spring action, which pawl in the resting position of the lever 7 rests against an untoothed part of the blocking arm 8 inside of the lower ratchet toothing. In mesh with the corresponding ratchet toothing the pawl 16 is arranged to prevent the lever 7 from swinging outwards against the front wall of the house 4, but on the other hand admit swinging in the opposite direction. The lower ratchet toothing defines thirteen blocking positions, of which the inner seven correspond to blocking positions defined by the upper ratchet toothing.

Just inside the slot 5 and above the path described by a token in the casing 6 at an inwards swinging of the lever 7 a light source LKI is located, being arranged downwards to direct a light beam having parallel rays. Beneath this light source LKI and the above mentioned path two parallel, horizontal rows of photo-diodes F10–F19 and F20–F29, each containing ten photo-diodes, are located.

Behind and above the light source LKI a blocking check memory SM containing a light source LKM is located. Said light source is arranged by means of a running film and by the help of a cylinder lense 17 situated beneath said path to project an essentially plane beam of parallel rays against a row of seven photo-diodes F1–F7 situated in the focus of the cylinder lense.

When a purchase is to be accomplished by the help of the automatic system, a token 1 is placed into the casing 6 with the power direction Y of the punch code openings in the swinging direction of the lever 7 and consequently the denomination direction X in parallel with the shaft 10, i.e. perpendicular to the plane of the paper in FIG. 4.

The operation handle 11 is swung inwards to its inner position, whereby at first the spring 13 is stretched. This causes that the lever 7 to swing inwards against the spring action of the spring 14 to a blocking position, in which the both pawls 15 and 16 are in mesh with their respective very innermost ratchet tooth 9. When the lever 7 is in said blocking position, the blocking arm 8, by the help of a cam tappet 18, switches on a micro-switch IK, which is connected in a circuit containing the light source LKI. In this blocking position the code punches in the token for account number and check number are located with the code punching of the lowest power directly above respective photo-diode rows F10–F19 and F20–F29, having an extension perpendicular to the plane of the paper in FIG. 4.

In the present case with the token shown in FIG. 3 in the first blocking position the outermost photo-diode row F10–F19 is exposed by light through the 0-hole of the account number in the lowest figure place, and the innermost photo-diode row F20–F29 through the 1-hole of the check number in corresponding figure place. If the photo-diodes are indicated in rising power, this consequently means that in the first blocking position the photo-diodes F10 and F21 are exposed to light.

Figure 2A:
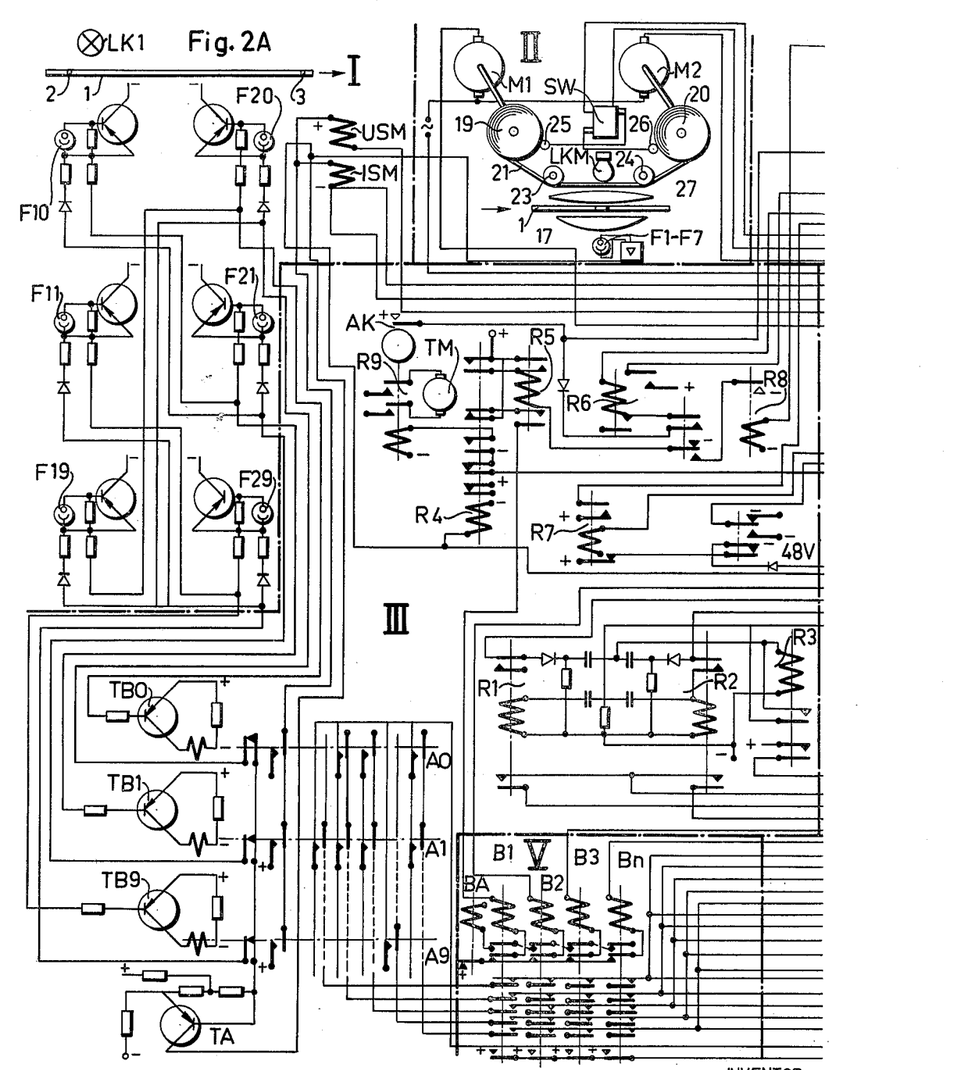
FIGS. 2a and 2b show the same system in a partly simplified connection diagram.
Figure 2B:
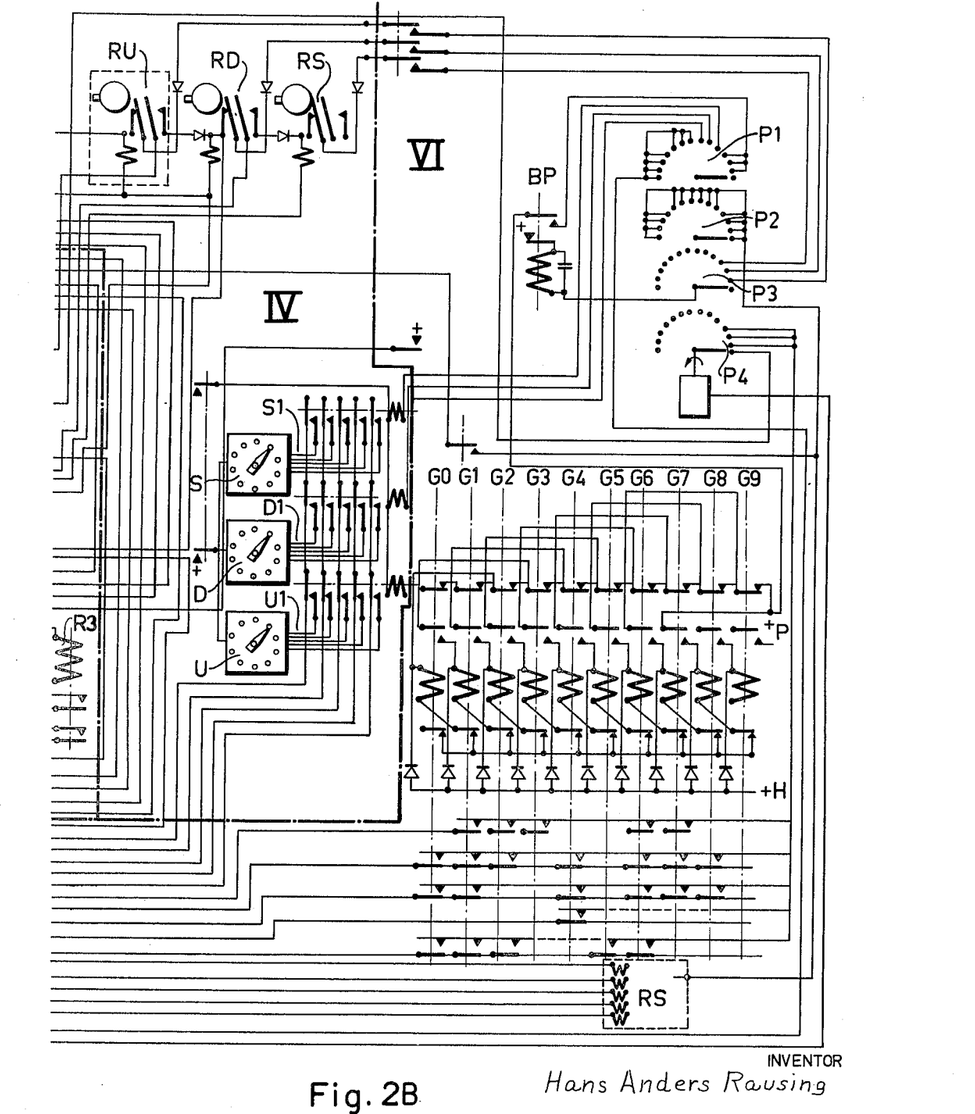

As is apparent from the connection diagram in FIG. 2, the photo-diodes each are provided with transistorized current amplifiers. Between the rows F10–F19 and F20–F29 the photo-diodes are mutually connected in series in accordance with the chosen, above mentioned permutation code. Thus, the photo-diode F10 is connected to the photo-diode F21, F11 to F29 . . . F19 to F20. To each of the photo-diodes F20–F29 via respective diode current amplifiers a transistorized control amplifier TB0, TB1 . . . respectively TB9 for corresponding relay A0–A9 is connected in series. The last mentioned control current amplifier and relays as well as the common relay R4 for all of the photo-diodes F20–F29 with corresponding transistorized control current amplifier TA are together with other devices an integral part of the earlier mentioned control unit III.

The connection is so made that a coincident lighting through holes in the token against two "associated" photo-diodes, one in each row F10–F19 and F20–F29 is required in order to actuate the corresponding control current amplifier TB sufficiently to actuate the relay A. If, however, two photo-diodes, not being associated, are exposed by light at the same time, no relay-responding is obtained, because the current from respective control current amplifier is too low. Thus the base circuit of the control current amplifier TA is still connected to the photo-diode amplifiers, and therefore the relay R4 responds and causes the token 1 to be removed from the casing 6 and kept in the receiver house 4, and the automatic system is restored to its normal state.

Should more than two photo-diodes F10–F29, for example an associated pair of photo-diodes and one or more "odd" photo-diodes, be exposed by light at the same time, the associated pair of photo-diodes brings the corresponding relay A into function, while the "odd" photo-diodes cannot actuate any of the relays A, but on the other hand is able to give a sufficient current in order to respond the relay R4.

If more than one pair of associated photo-diode pairs should be exposed by light at the same time, none of the relays A responds, since the control current to the relay is limited through a common resistor for all the relays A with such a resistance that the current only is sufficient for actuating one single relay. Instead even in this case the relay R4 is actuated.

Since at the same time in the first blocking position both associated photo-diodes F10 and F21 are exposed to light, the corresponding relay A1 responds and switches on the control current circuit of the input stepping magnet ISM, which lifts the pawl 15 so that the lever 7 is swung inwards by the spring 13. At this moving the relay A1 releases and switches off the circuit to the input stepping magnet ISM so that the pawl 15 again is in mesh with the upper ratchet toothing 9. Thus, the lever 7 is moved one ratchet tooth graduation inwards so that in the new blocking position the token 1 has the code holes of the next power in the account and check numbers above respective photo-diode row F10–F19 and F20–F29.

In this second blocking position in the present case the photo-diodes F11 and F29 are consequently exposed to light. These photo-diodes are connected in series in accordance with the chosen code uniting between the account and check numbers. The relay A9 responds, and again by the stepping magnet ISM the token is stepped one step forward.

In the same manner the remaining of the account and check number of the cards are checked. When after a finished checking of the 3-hole of the account number in the highest power against the 8-hole in the same power the stepping magnet ISM lifts the pawl 15, and by the help of the spring 13 the lever 7 is moved inwards to an innermost position in which a limit switch BK is switched on. When at the outwards swinging from its innermost blocking position the blocking arm 7 leaves this, the above mentioned micro-switch IK loses contact with the cam 18, and therefore the light source LKI is switched off. The pawl 15 falls again down into the upper side of the blocking arm 8, but outside its ratchet toothing 9, and therefore the inwards moving of the lever 7 thereafter proceeds independently of said toothing.

The falsification checking made by the identification unit I is based upon the principle that an eventual falsifier of tokens in order to make it possible for the falsified token to pass the checking in the identification unit I must be in position of information about the code, uniting the account and checking numbers.

Tokens, which unimpededly could pass the falsification checking, could, however, for one or another reason be unwarranted. For example they could, due to non-payment to the corresponding account be "blocked." The blocking can even be dependent on the token being reported stolen or lost. In order to obstruct falsifications of the tokens, certain numbers or series of numbers could be blocked.

After the above described falsification checking there follows a checking of the token in the blocking check unit II. As mentioned above, the main part of this is located in the token receiver house 4. Besides in FIG. 4 the blocking check unit is shown as well in FIG. 2 and FIG. 6, to which figures the following description is directed. The blocking check unit contains a memory SM, containing two vertical reels 19 and 20 situated at a distance from each other, each having a motor M1 and M2. A film band 21 is wound on the reels 19 and 20. Said film band 21 is led beneath a pair of guide rollers 23 and 24 situated at a distance from each other in order to be held mainly horizontal at a part of its loop between the reels 19 and 20. Above this horizontal part of the film band the earlier mentioned light source LKM is situated. This light source is arranged to project light through the film band 21 and against the row of seven photo-diodes F1–F7 situated below the film band.

On the film band 21 in negative and in a reduced scale the blocked token codes are reproduced in the power direction one behind another. For practical reasons either just the account or the check number code at which the holes are transparent is reproduced while the surrounding fields are black.

When the lever 7 takes its innermost position, in which it switches on the limit switch HK the token 1 is situated right beneath the horizontal plane part of the film band 21 and above the cylinder lense 17 and the photo-diode row F1–F7, which row is horizontal and perpendicular to the power rows X of the token 1.

The photo-diodes F1–F7 are each mutually connected in series and connected to a current amplifier, together with the earlier mentioned current amplifier TA which is parallel connected to the coil of the relay R4.

When the earlier mentioned limit switch HK is switched on, a control voltage via two capacitors is applied to the two relays R1 and R2. Owing to the position of a changing switch SW sensing the film diameter on the both reels 19 and 20, one of the relays R1 or R2 becomes self-holding, while the other relay releases after a fixed time determined by the capacitance of respective capacitor. The motor M1 or M2 responsive to relay R1 or R2 does not receive current via a relay contact and winds the film band 21 on its reel 19 or 20. When the film on the other reel 20 or 19 is used up a spring loaded sensing roll 26 or 25 belonging to the changing switch SW falls into an earlier trace covered by the film on the reel, so that the changing switch SW changes to its other position. Owing to the fact that the responded relay R1 or R2 loses its self-holding it releases and switches off the current circuit for the driving motor M1 or M2. The non-driving motor is stopped mechanically or electrically.

At the moving of the film band 21 the consecutive reproductions of blocked number codes first projected are, by the help of an enlarging optics 27 projected against the field of the token 1 in the casing 6, where the pnnched code number of corresponding description is to be found. If one reproduced number on the film band corresponds to the punched code number of the token, the rays coming from the transparent field of the film band 21 pass through corresponding punch holes in the token 1 and are, by the cylinder lense 17 refracted to a plane incident to each one of the photo-diodes F1–F7. At this simultaneous activating of all photo-diodes F1–F7—and only then—an output current sufficient for the relay R4 is obtained from the common current amplifier for all of the photo diodes. When the relay R4 is actuated by the output current, the token 1 is removed from the casing 6 into a store in the receiver house 4, and the automatic system is restored into its normal position.

When the whole film 21 is rewound, the two-way switch SW, as earlier mentioned, switches to its opposite position. When the switch SW changes position, the relay R3 receives a voltage impulse, through which the relay R3 responds and becomes self-holding. At its switching the relay R3 breaks the current to the light source LKM. Furthermore, the relay R3 switches on a circuit controlling to an indicator lamp located on the front of the receiving house 4, and if, the relay R4 is not actuated, the relay R3 also switches on a contact connecting a breaking contact in a switch hook HK to the control voltage source. The switch hook HK is pressed down and its said contact is broken when the nozzle of the filling pump is hung up in its place on the side of the filling pump.

The described film memory SM is particularly advantageous for the purpose. The film 21 can be wound with a relatively high constant speed, for example approximately 1 meter a second, since the reaction velocity for the photo-diodes F1–F7 hardly is limited in that respect. New memory information could easily be registered and old information could be removed through joining or cutting of the film band 21. When after a finished blocking check the indicator lamp L on the receiver house 4 is switched on, the operation handle 11 can be released to be brought back to its starting position by the spring 13. On the other hand the lever 7 is still blocked in its innermost position by the lower pawl 16 and against the effect of the spring 14.

When the nozzle of the filling pump is lifted off the switch hook contact set HK, the earlier mentioned breaking contact of the switch hook is switched on so that the control voltage is fed to a relay R9 thereby switching on the circuit of the filling pump motor so that said motor is started. The switch hook contact set HK contains besides said breaking contact a closing contact and a further breaking contact. When the nozzle is lifted off, the second breaking contact of the switch hook switches on the control circuit of a relay R5 thereby becoming self-holding.

The filling pump is provided with an indicating counting device which in its turn is provided with a contactor KON arranged, for each delivered deciliter, to emit a voltage pulse to an intermediate register consisting of three counting units RU, RD and RS. The counting units RU, RD and RS each represents a decade.

The decimal or deciliter decade counter RU steps one step for each voltage pulse from the contactor KON. The tenth voltage pulse switches on its home position contact so that the unit decade counter RD is stepped forward one step. In a corresponding manner the tenth decade is stepped one step at the tenth pulse to the unit counter RD.

The purpose of the intermediate register two relays R6 and R7 is to prevent the first pulse to the counters RU respectively RD from actuating more than the intended counter. At the first pulse to the counter RU the relay R6 responds and remains in its switched on position through self-holding until another selector relay B1 responds. This happens first when the switch hook contact set HK after a finished filling operation again is pressed down by the nozzle, because the control circuit of the selector relay B1 contains the above mentioned closing contact at the switch hook contact set HK and a closing contact in series with that contact in the relay R5. As long as the relay R6 is switched off, the circuit to the unit counter D is broken.

In a similar manner the relay R7 controls the circuit of the tenth counter RS. When after a finished filling operation the pump is stopped, and thus the pulses from the contact device KON are stopped, the delivered quantity of fuel is registered in the intermediate register.

Means for supplying data for the actual transaction, for example embracing the quality (price) of the fuel, the identity (number) of the filling station, the identity (number) of the filling pump, the date of the transaction etc. also belong to the filling pump. As an example of such means three change over switches U, D and S, conceived to admit a three place setting of the fuel quality specification in the international teleprinter code is shown in FIG. 2. To each of the switches, U, D and S belong a releasing relay UR, DR respectively SR.

For debiting purpose the vending machine system is provided with a recording apparatus by the help of which the data for each transaction is recorded on a suitable recording media. In the present case the recording apparatus consists of a tape punching apparatus TP, on the tape of which said data is punched in the international teleprinter punch code. The tape punching apparatus TP and a feeding register G for the intermediate register containing the counters RU, RD and RS are integral parts of the central registration unit VI, serving several filling pumps and furthermore containing a program device P.

Because just one filling pump at a time shall be able to use the common registration unit VI a certain queue selection unit V is arranged. It consists of a common queue relay BA and several seizing relays B1, B2 . . . Bn, one for each pump, the relay B1 being the seizing relay for pump in question.

When the switch hook contact set HK after a finished filling operation is restored by the nozzle to its normal position, the relay B1 is directed. If the common registration unit VI is not seized, i.e. if the relay BA is switched off, the relay B1 responds, and as a result the relay BA also responds. If on the other hand the registration unit VI already is engaged, the seizing relay B1 "waits" in order not to respond, until the relay BA is released after a former registration operation. Should two seizing relays be directed at the same time, the relay at the left in FIG. 1 remains in responded position, since this relay, when it responds by means of its breaking contacts, breaks the current supply circuit to the right relay.

In the present case the common registration unit VI is supposed to be disengaged, and therefore the relays B1 and B2 both respond.

When the relay BA is switched on, the program device P is started and takes over the control of the chronological order between the remaining operations in the functioning of the system.

The next operation is a reading out to the output register G and a punching of the registration tape in respect to the quality registration in the intermediate registers RU, RD and RS connected through the actuating of the relay B1 to the program device P. In doing so each of the counting devices of the intermediate registers RU, RD and RS is set to zero by means of a back pulse emitter BP and the number of pulses registered for the zero setting is counted by the output register G consisting of ten relays G0–G9 in an open chain of relays. Over all of the relays G0–G9 is applied a holding voltage (see at +H in FIG. 2). The back pulse emitter BP gives the relays G0–G9 in turn the required additional voltage (at +P) for the purpose that respective relay shall respond and the next preceding one shall release.

Thus, at the first back pulse the relay G0 responds; at the second the relay G1, while the relay G0 releases; at the third the relay G2, while the relay G1 releases etc. The relay in the relay chain G0–G9, actuated after the last back pulse from the counting unit RU, RD or RS in the intermediate register, gives in its set of relay contacts the punch combination of the actual registration value in teleprinter code.

The punching of the registration in the output register G is dependent upon the emitting of a releasing signal from section P2 of the program device P to the tape punching device TP.

The transferring of the registration value in the intermediate register RU, RD, RS into the registration tape thus is done for one decade at a time and this means that the decade first is read out to the output register G and after that transferred into and punched in the punch device TP. After each punching operation the output register G is set to zero, i.e. the actuated relay in the chain G0–G9 is released and the tape is advanced one step.

The signal from the program section P2 releasing the punching operation is also applied to the output stepping magnet USM when the responding of the relay B1 is connected to the program device P. Consequently the lower pawl 16 is moved aside from the lower ratchet toothing 9 of the blocking arm 8 for sufficient time for the spring 14 to move the lever 7 one ratchet tooth step outwards.

When the decade counter units RU, RD and RS have been emptied, the registration tape has been charged with three succeeding number punchings, and besides the token 1 has been advanced three steps in the token receiving house 4.

The three following punching operations relate to the quality registration in the three change over switches U, D and S. In turn the program section P1 causes the releasing relays UR, DR and SR of respective switches to supply its punch combination to the punching device TP for punching therein depending upon releasing signals from the program section P2. The tape is consequently provided with three consecutive number punchings corresponding to the adjusted values of the switches U, D and S, and besides the token 1 is advanced three more steps.

When the tape has been charged with the registrations concerning goods quantity and quality, the token 1 is thus brought back to the position in which the punch holes of the highest power, i.e. the three hole and eight hole in the account and check number punch codes of the token 1 are located right above the photo-diode rows F10–F19 and F20–F29 of the identification unit I. The cam 18 on the blocking arm 8 has again switched on the micro-switch IK and thereby lighted the light source LKI. As by the falsification check the associated photo-diodes F13 and F28 are accordingly exposed to light, and thereby the corresponding relay A8 responds and by the help of its set of punch combination contacts in teleprinter code said relay connects up either the figure 3 or the figure 8 depending upon whether the account number or the check number shall be registered on the tape. Here is presupposed that the account number shall be registered, and therefore in this case the figure 3 is connected up.

Via the contact set of the seizing relay B1 the 3-connection of the relay A8 is transferred to the punching apparatus TP and by this brought on the tape.

At the next releasing signal from the program device section P2 the tape is stepped forwards, and the token 1 is advanced an additional step, and thereafter the next lower power in the account number is read into the punching apparatus TP, in which the punching operation is performed.

The consecutive reading and the punching of the powers of the account number is carried on in declining succession in a similar manner until the whole account number is punched on the tape. At the accomplishment of the punching of the lowest power of the figure 0 the program device returns to its home position, whereupon the section P4 of the program device gives current to a disconnection relay R8 restoring the machine to its normal position.

The token 1 used can be removed from the token casing 6, thereafter being prepared to receive a new token for a new vending transaction.

In the above it is presupposed that the vending through vending machine system is based upon credit transactions, in which the controlling token primarily is an account proof. By means of suitable modifications of the system vending based upon cash transactions is, however, also possible. For such a vending the system shall be able to be controlled by cash marks corresponding to the above described token, but provided with information of the amount, to which said marks are valid. This information could be entered into figure places which an integral parts of the "account number" and the "check number" on the token with the earlier mentioned code relation between the both numbers still in force.

The falsification check with respect to the modified account and check numbers is still the same as described above, but the presence of a cash purchase marking in a figure place connects, however, the reading relays A to a memory register, being advanced in dependence upon which reading relays A responding at the checking of the corresponding figure places in the numbers against the actual amount of cash. In the present case a translation means must be connected between the reading relay A and said memory register. Said translation means translates amount to goods quantity and is manually adjustable to current price per quantity unit.

A blocking check is in itself not necessary in the cash transaction but may, however, for practical reasons be kept.

The cash purchase marking on the token must also attend, that the means in the token receiver house 4 for removing unlegitimate tokens from the casing 6 and storing the same in the house 4 and also storing the cash marks therein, after performing the modified falsification check and eventually the blocking check. In this case no restoring of the system shall be done, since the transaction valid data except for the token identity ought to be punched on the registration tape.

In retailing from the filling pump its impulse emitter IMP both engages the intermediate registers RU, RD, RS and sets the earlier engaged memory register of the reading relays A to zero. When the memory register is set to zero, the pump motor relay R9 drops, and thereafter the nozzle again brings the hook contact set HK back to its normal position. Thereby the earlier described registration operation resulting in a punching on the registration tape starts. The reading out of the account number to the punching device TP and the punching operation occurs, however, not without the therein co-operating parts of the system except that for advancing of the card casing frame 6 having been made passive.

Although in the above description only photo-electric sensing means are mentioned in connection with the identification as well as the blocking check of the tokens, electro mechanical sensing means could be used for the identification unit in connection with tokens of punch cards type made of insulating material. It is also possible to use tokens with magnet point markings instead of punch markings, and not only the identification unit but also the blocking check unit must be modified in accordance therewith. In that case the film band 21 in the blocking check memory SM for example is replaced by a magnetic registration tape, which has the blocked account numbers recorded one after the other in magnet point characters. The comparison between the magnet point markings of the token and the recorded magnet point on the magnetic tape is performed by magnetic sensing means with associated circuits.

I claim:

1. In a key and lock system the combination comprising a plurality of differently coded key members, each said key member carrying a signature comprising a plurality of index elements arranged in two equinumerant groups, one of said groups of index elements constituting the particular account number of that key member and the other groups of index elements constituting a checking number, the account and checking index elements of the two equinumerant groups of each key member being interrelated by a predetermined conversion code common to all key members, a lock device comprising normally active locking means, means for sensing said key member signature, and means for checking one of said equinumerant index element groups against the other one, said checking means only upon ascertaining said predetermined conversion code relationship between said two index groups inactivating said locking means.

2. A system according to claim 1, said lock device comprising confiscating means under control of said checking means for confiscating any key member said two index element groups of which are interrelated by a conversion code other than said predetermined one.

3. A system according to claim 1, said key member having in said two index element groups associated index elements of, a predetermined character, said lock device comprising confiscating means under control of said checking means for confiscating said key member in response to checking the index elements of said predetermined character against each other.

4. A system according to claim 1, said key member having in addition to said two equinumerant index element groups a separate index element, said lock device comprising confiscating means under control of said sensing means for confiscating said key member in response to sensing said separate index element.

5. In a key and lock system the combination comprising a plurality of differently coded key members, each said key member carrying a signature comprising a plurality of index elements arranged in two equinumerant groups, one of said groups of index elements constituting the particular account number of that key member and the other groups of index elements constituting a checking number, the account and checking index elements of the two equinumerant groups of each key member being interrelated by a predetermined conversion code common to all key members, and a lock device comprising first and second normally active locking means, means for sensing said key member signature, first checking means for checking one of said equinumerant index element groups against the other one and only upon ascertaining said predetermined conversion code relationship between said two index element groups for inactivating said first locking means, storage means storing information relating to revoked or otherwise illegitimate key members and corresponding to said one index element group, and second checking means upon inactivation of said first locking means for checking successively said one index element group of said key member against said stored information and for inactivating said second locking means upon failure to ascertain coincidence between said one index element group and said stored information.

6. A system according to claim 5, said lock device comprising confiscating means under control of said first checking means for confiscating any key member said two index element groups of which are interrelated by a conversion code other than said predetermined one.

7. A system according to claim 5, said key member having in said two index element groups associated index elements of a predetermined character, said lock device comprising confiscating means under control of said first checking means for confiscating said key member in response to checking the index elements of said predetermined character against each other.

8. A system according to claim 5, said key member having in addition to said two equinumerant index element groups a separate index element, said lock device comprising confiscating means under control of said sensing means for confiscating said key member in response to sensing said separate index element.

9. A vending machine for dispensing fluid products comprising a pump for pumping said fluids, means for starting said pump, a meter for measuring the fluid pumped by said pump, a calculator driven by said meter for calculating the cost of the fluids dispensed as a function of a unit price, a recorder connected to and driven by said calculator, recording means on said recorder for recording the cost on a record, means for activating said recorder to record said cost, a lock device so disposed and arranged as to prevent operation of the pump unless one of a plurality of differently coded key members is provided, each said key member carrying a signature comprising a plurality of index elements arranged in two equinumerant groups, one of said groups of index elements constituting the particular account number of that key member and the other group of index elements constituting a checking number, the account and checking index elements of the two equinumerant groups of each key member being interrelated by a predetermined conversion code common to all key members, said lock device comprising first and second normally active locking means, means for sensing said key member signature, first checking means for checking one of said equinumerant index element groups against the other one and only upon ascertaining said predetermined conversion code relationship between said two index element groups for inactivating said first locking means, storage means storing information relating to revoked or otherwise illegitimate key members and corresponding to said one index element group, and second checking means upon inactivation of said first locking means for checking successively said one index element group of said key member against said stored information and for inactivating said second locking means upon failure to ascertain coincidence between said one index element group and said stored information, said second locking means being connected to said means for starting the pump and upon inactivation permitting the means for starting the pump to operate.

References Cited by the Examiner

UNITED STATES PATENTS

| | | | |
|---|---|---|---|
| Re. 25,254 | 10/1962 | Harris | 222—2 |
| 2,792,148 | 5/1957 | Goldenberg | 222—2 |
| 2,914,746 | 11/1959 | James | 235—61.12 |

MALCOLM A. MORRISON, *Primary Examiner.*

DARYL W. COOK, *Examiner.*

W. S. POOLE, *Assistant Examiner.*